Dec. 16, 1969     J. A. BONESHO ET AL     3,483,951
SELF-OPTIMIZING VIBRATION DAMPERS
Original Filed Aug. 28, 1967     11 Sheets-Sheet 1

SINGLE VARIABLE DAMPER AND MAIN SYSTEMS

OPTIMIZATION PROCESS FOR LOW FREQUENCY

INVENTORS
James A. Bonesho
John G. Bollinger
by McDougall, Hersh, Scott
and Ladd
Attys

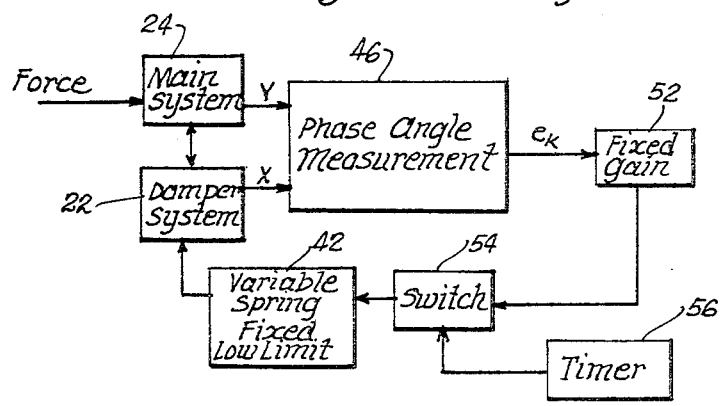
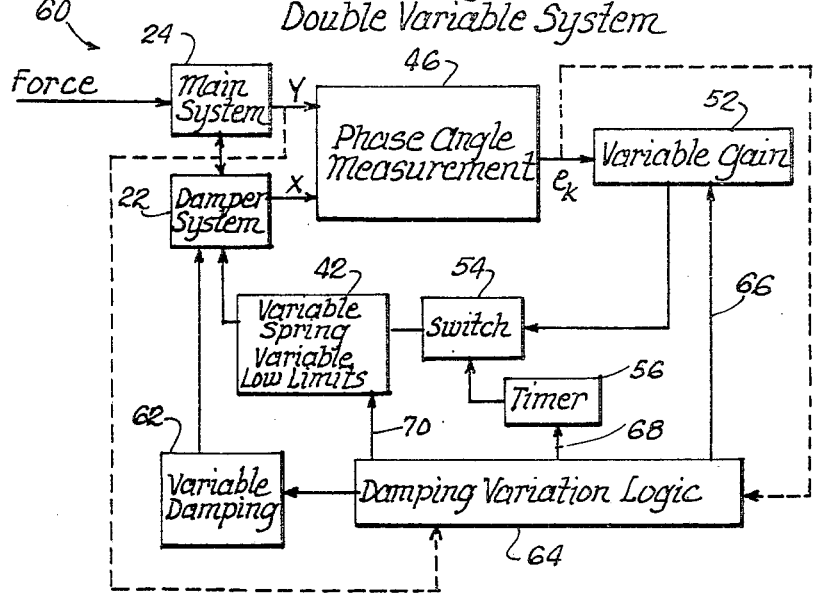

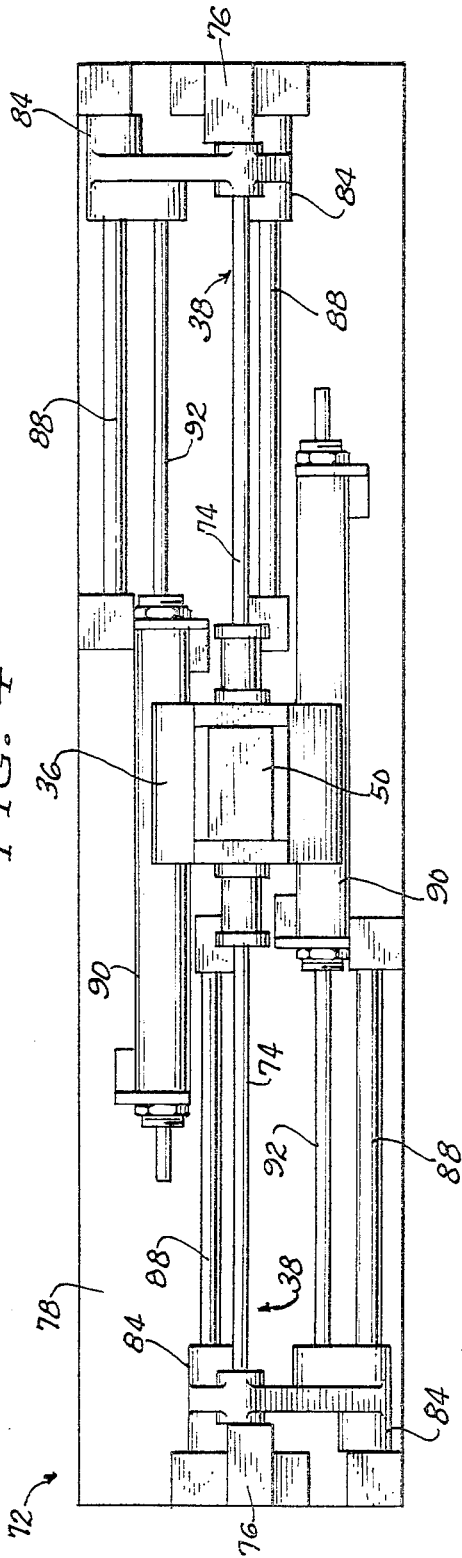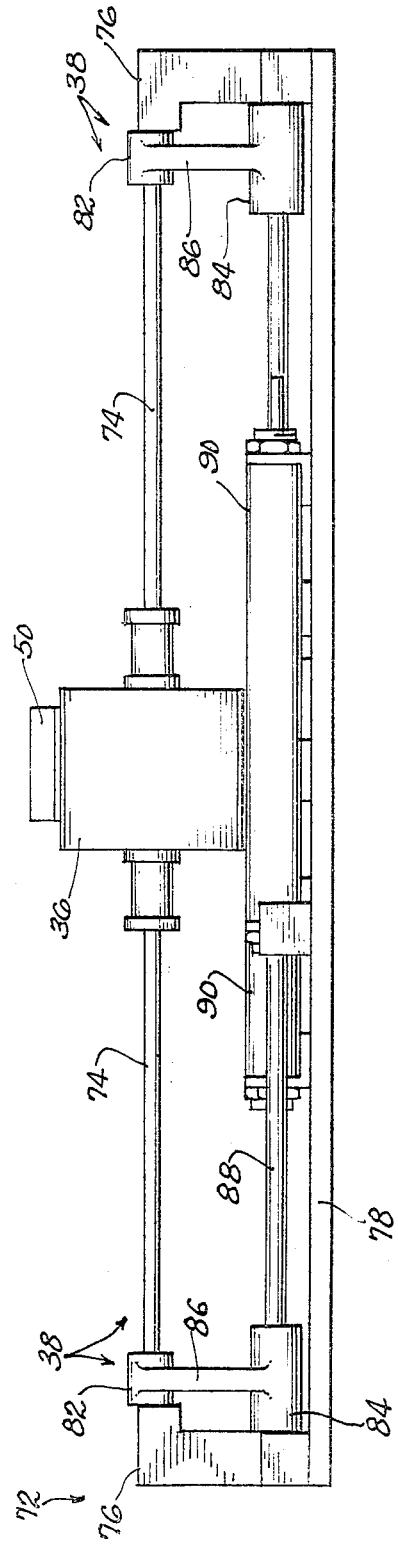

DAMPER TEST EQUIPMENT SCHEMATIC

SINGLE VARIABLE DAMPER SCHEMATIC

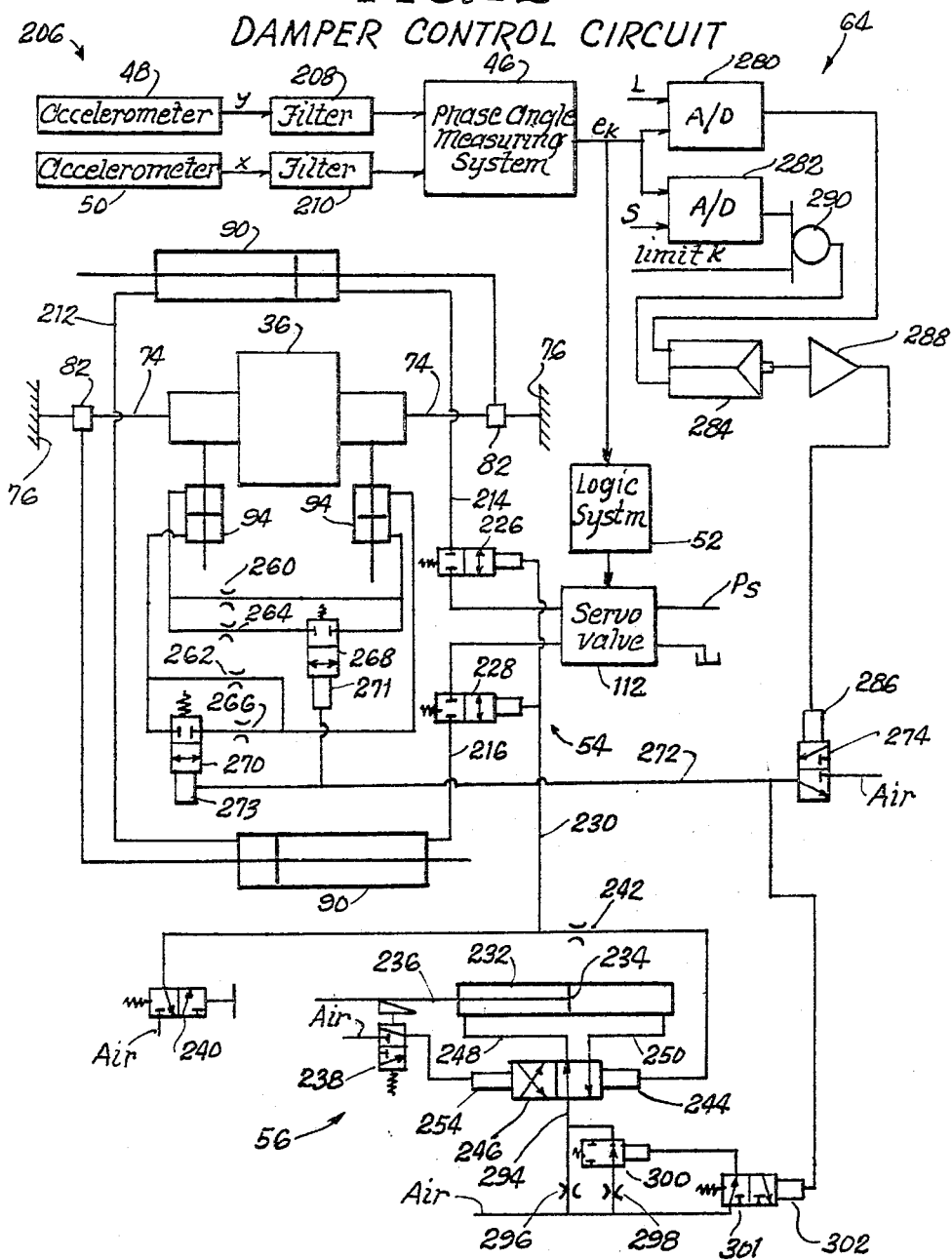

OPTIMIZATION PROCESS FOR HIGHER FREQUENCY

FREQUENCY RESPONSE COMPARISON FOR THE SINGLE VARIABLE DAMPER

FREQUENCY RESPONSE COMPARISON
(SINE WAVE EXCITATION)

COLUMN AMPLITUDE COMPARISON
(SQUARE WAVE EXCITATION)

United States Patent Office 3,483,951
Patented Dec. 16, 1969

3,483,951
SELF-OPTIMIZING VIBRATION DAMPERS
James A. Bonesho, Alexandria, Va., and John Gustave Bollinger, Madison, Wis., assignors to Wisconsin Alumni Research Foundation, Madison, Wis., a corporation of Wisconsin
Continuation of application Ser. No. 663,833, Aug. 28, 1967. This application Dec. 6, 1968, Ser. No. 784,283
Int. Cl. F16f 15/00; G01r 25/00
U.S. Cl. 188—1                                30 Claims

ABSTRACT OF THE DISCLOSURE

A self-optimizing system for minimizing vibrations, comprising a vibratory damper mass, spring means connected between said damper mass and the vibratory body, the vibrations of which are to be reduced, control means for varying the effective stiffness of said spring means, means for measuring the phase angle between the vibrations of said body and the vibrations of said damper mass, and means for varying said control means to cause the phase angle to approach 90°. The damper mass may also be provided with a variable damping device, and means for reducing the damping effect of said device as said phase angle approaches 90°.

---

This application is a continuation of Ser. No. 663,833 filed Aug. 28, 1967, now abandoned.

This invention relates to systems and devices for reducing vibrations in machine tools, buildings, vehicles, road machinery, and various other situations.

Vibratory phenomena are inherent in all mechanical systems. Excessive vibrations can inhibit the designed function of mechanical elements or cause high cyclic stresses that end in early fatigue failures. An additional objection to vibrations is noise when frequencies are in the audible range and result in irritation to personnel. The chatter behavior of machine tools, vibration of operator platforms, vibration of earth moving equipment, torsional oscillation of drive systems and noise generated by motors and gears serve as further examples of undesirable vibratory conditions. Therefore the reduction or elimination of vibrations is an important engineering problem.

Vibration reducing devices are of two types—absorbers and dampers. Absorbers work on the principle of transferring vibrational energy to an auxiliary system. They dissipate no energy. The Frahm dynamic vibration absorbers, and the centrifugal pendulum, are the translational and rotational examples respectively. While absorbers reduce vibration for one fixed narrow frequency band, they increase oscillations for two other frequency bands. However, they are very useful for forced oscillations of a fixed frequency. Dampers, on the other hand, dissipate energy and reduce amplitudes over large frequency ranges. The Lanchester damper, and the Houde damper, and other types that rely on rubber or one material to provide both spring rate and damping are generally difficult to tune properly, but they are effective. In applications requiring high precision machining, damper-reduced oscillations might still be of an undesirable amplitude.

The present invention provides a self-optimizing vibration damper which automatically tunes itself to an optimum condition, or nearly so, so that the vibrations in the main system will be reduced to a minimum or substantially so. The self-optimizing vibration damper is capable of adapting itself to changes in the frequency of the vibration in the main system. The vibratory frequency may change due to changes in the cyclic forces which are causing the vibrations. Moreover, the vibratory frequency may change due to changes in the natural vibratory frequency of the main system. Such changes may occur in machine tools, for example, due to the movement of a quill, carriage, or some other movable component of the machine.

The self-optimizing system of the present invention is adapted to be employed in connection with a vibratory body or mass, the vibrations of which are to be reduced. The vibratory body may assume many forms. Thus, it may comprise a supporting member of a building, a machine tool support or other member, or a component of a vehicle, for example. The system comprises a vibratory damper mass which is smaller than the main mass. Spring means are connected between the main mass and the damper mass, so that the damper mass is supported for vibration. Control means are provided to vary the effective stiffness of the spring means. A control circuit or system is provided to vary the control means so that the phase angle between the vibrations of the main mass and the damper mass will approach 90°. It has been found that the vibrations of the main mass are minimized when the phase angle is brought to 90°. The control system preferably comprises vibration pick-ups for producing signals corresponding to the vibrations of the main mass and the damper mass. Measuring means are preferably provided to measure the phase angle between the vibration signals. The measuring means preferably produce a control signal which changes polarity when the phase angle goes through 90°. Means are provided to operate the control means, and thereby change the stiffness of the spring means, in response to the control signal.

The system reduces vibrations very effectively without changing the damping of the damper mass. However, a further improvement can be achieved by providing a variable damping device for damping the damper mass. Means are provided to reduce the damping effect of the damper device, as the optimum condition is approached.

Further objects, advantages, and features of the present invention will appear from the following description, taken with the accompanying drawings, in which:

FIG. 2 is a schematic diagram of a slightly modified system.

FIG. 3 is a schematic diagram of a modified system which incorporates a variable damping device for the damper mass.

FIG. 4 is a plan view of a damper mass unit which may be employed in the self-optimizing systems of FIGS. 1–3.

FIG. 5 is an elevation of the damper mass unit.

FIG. 12 is a schematic diagram of a damper system which constitutes an elaboration of the system of FIG. 3, in which both the spring rate and the damping are varied in the damper system.

FIG. 17 is for sine wave excitation, while FIG. 18 is for square wave excitation.

Figure 1:
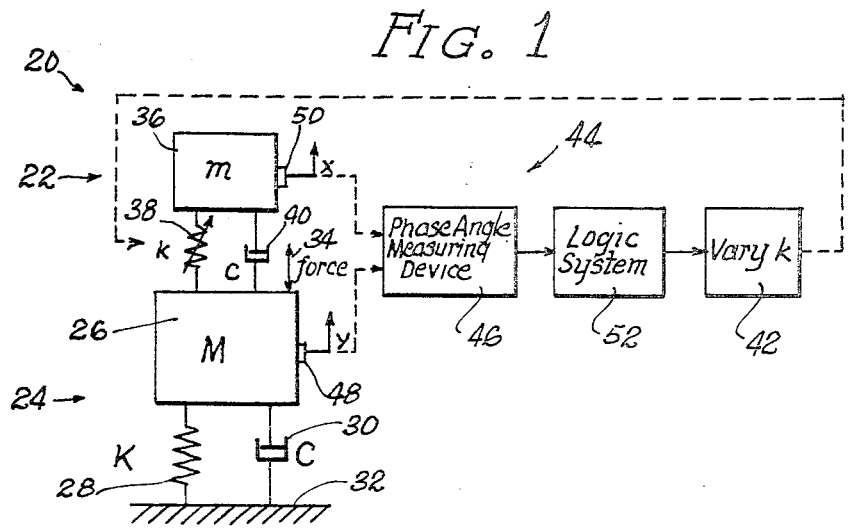
FIG. 1 is a schematic diagram of a self-optimizing damper system, constituting an illustrative embodiment of the present invention.

FIG. 1 constitutes a schematic illustration of a vibratory system 20, comprising a damper system 22 for reducing the vibrations in main system 24. For purposes of illustration, the main system 24 is represented as comprising a main vibratory body 26 having a mass M. The main vibratory body 26 has a resilient support, represented as a spring 28 with a spring constant K, which is a measure of the stiffness of the resilient support. The damping in the main system 24 is represented as a dash-pot or other damping device 30, having a damping coefficient C. The spring means 28 and the damping means 30 are represented as being connected between the main vibratory body 26 and a solid base or foundation 32.

Vibrations in the main system 24 may be produced by the application of an intermittent or cyclic force to the main mass 26. Such force is represented by an arrow 34.

The purpose of the damper system 22 is to minimize the vibrations in the main system 24. The damper system 22 is illustrated as comprising a damper mass or body 36 having a mass $m$ which is substantially less than the main mass M. The damper mass 36 is supported by damper spring means 38, connected between the damper mass 36 and the main mass 26. The damping in the damper system 22 is represented as a dash-pot or other damping device 40. The damper spring 38 has a spring rate $k$, while, the damping element 40 has a damping coefficient $c$.

The damper spring 38 is variable so that the stiffness or rate of the spring can be varied while the system is in operation. In this way, the damper system 22 can be tuned to the optimum condition, in which the vibratory energy of the main system 24 is absorbed by the damper system 22, so that the vibrations of the main system 24 will be minimized. Power control means 42 are provided to vary the stiffness of the spring 38. The operation of the control means 42 is governed by a control system 44, which is responsive to the vibrations of the main mass 26 and the damper mass 36. While the ultimate object of the system is to minimize the vibrations of the main mass 26, it has been found that the damper system 22 can best be optimized with reference to the phase angle between the vibrations of the main mass 26 and the damper mass 36. A very close approximation of the optimum condition is achieved by adjusting the spring 38 so that the phase angle is brought to 90°. There is only a negligible error between the condition of the damper system for a phase angle of 90° and the true optimum condition, in which the vibrations of the main mass 26 are at their lowest point. Such error approaches zero as the damping coefficient of the damper system 22 is reduced toward zero. Inasmuch as the damping coefficient of the damping system 22 is normally quite low, there is only a negligible departure from the true optimum in varying the spring 38 so that the phase angle approaches 90°. Moreover, there are distinct advantages in employing the phase angle as the criterion for varying the spring 38. The phase angle provides a criterion which is unambiguous. Thus, if the damper spring 38 is too stiff, the phase angle is always less than 90°. In fact, the phase angle rapidly approaches zero as the spring is made stiffer than the optimum value. When the spring 38 is less stiff than the optimum value, the phase angle is always greater than 90° and rapidly approaches 180°. The phase angle provides a sensitive criterion, in that a small change in the variable spring 38 produces a great change in the phase angle as it moves through 90°. Moreover, it is easy to measure the phase angle and to produce a control signal which will indicate whether the phase angle is greater or less than 90°.

Thus, the illustrated control system 44 comprises measuring means 46 for measuring the phase angle between the vibrations of the main mass 26 and the damper mass 36. The measuring device 46 preferably receives vibration signals from vibration pick-ups 48 and 50 connected to the main mass 26 and the damper mass 36. Preferably, the measuring device 46 produces a control signal which changes polarity as the phase angle goes through 90°. The magnitude of the control signal is preferably proportional to the departure of the phase angle from 90°. Those skilled in the art will be familiar with various phase angle measuring devices which will produce such control signals. Further details of the measuring device 46 will be described below.

The control signal from the measuring device 46 is supplied to logic means 52 which operate the control means 42 in accordance with the control signal. Thus, the control means 42 may be caused to increase the stiffness of the spring 38 for a control signal of one polarity while decreasing the stiffness for a control signal of the opposite polarity.

FIG. 2 illustrates a slightly modified control system in which a logic switch or gate 54 is interposed between the logic means 52 and the spring control means 42. The switch 54 is gated or rendered operative at regular intervals by pulses from a timer 56. In this way, the spring is varied incrementally. Each increment of spring variation is followed by a pause, which allows time for transients to die out, so that the damper system 22 achieves a new steady state condition of vibration.

In the systems of FIGS. 1 and 2, the damping coefficient $c$ of the damper system 22 should be as low as feasible, in order to minimize the vibrations of the main system 24 to best advantage. The 90° phase angle criterion approaches complete accuracy as the damping coefficient approaches zero. Moreover, the efficiency of the damping system 22 becomes greater as the damping coefficient is reduced. In this way, a lower minimum of vibration can be achieved in the main system 24.

However, a damping coefficient of zero can never be achieved, because there is always some damping in the damping system 22. Moreover, a small amount of damping is desirable so as to cause the decay of transient conditions in the damper system 22. Without a small amount of damping, the damper system would respond too slowly to changes in the stiffness of the damper spring.

FIG. 3 illustrates a modified vibratory system 60 in which there are two variables in the damper system 22. As in the case of the systems of FIGS. 1 and 2, the damper spring is variable. The second variable is the damping coefficient of the damper system 22. Thus, the damper system 22 is provided with a variable dash-pot or other damping device 62, which replaces the fixed damping represented by the element 40 in FIG. 1. The variable damping device 62 is under the control of a logic amplifying system or means 64. Preferably, the control signal representing the phase angle is supplied from the measuring device 46 to the damping logic system 64. Such control signal is designated $e_k$, in FIGS. 2 and 3. The damping logic system 64 may also be supplied with the vibration signal from the main system 24. In FIGS. 1–3, this signal is designated $y$. The vibration signal from the damper system 22 is designated $x$.

It is preferred to reduce the damping afforded by the damping device 62 as the phase angle approaches 90°. The reduced damping provides greater accuracy in the final optimizing process. Moreover, the vibrations in the main system 24 are reduced to a greater extent. When the phase angle departs to a great extent from 90°, it is advantageous to employ increased damping so that the stiffness of the variable spring may be changed more rapidly, without troublesome effects from transients. The higher damping causes rapid decay of the transients so that the operation of the damper system 22 closely follows the changes in the spring rate.

It is advantageous to maintain the damping at a fairly high value until the vibrations in the main system 24 are reduced substantially by the action of the damper system. The higher damping protects the damper system 22 from any possible damage due to a high level of vibrations in the main system 24. Thus, the damper logic system 64 is preferably responsive to both the phase angle error signal $e_k$ and the main system vibration signal $y$.

The system 60 of FIG. 3 embodies some additional elaborations of an optional character. It will be seen that the damping logic system 64 is arranged to vary the gain of the variable spring logic system 52. When the damping is relatively high, a higher gain can be employed in the spring varying logic system 52, to achieve rapid adjustment of the spring, without any troublesome instability. When the damping is reduced to its low value, approaching zero, the gain is preferably reduced so that the spring will be adjusted more slowly.

The damping logic system 64 is also connected to the timer 56 so as to change the cycle of the timer when the damping is changed. For low damping, a somewhat longer cycle is preferred, so that a longer time interval will be provided for the decay of transients.

The damping logic system 64 may also be connected to the variable spring control device 42 so as to vary the lower limit of the spring constant $k$. With low damping, a somewhat lower limit may be employed. In FIG. 3 the connection between the damping logic system 64 and the spring varying logic system 52 is shown at 66. The connection between the damping logic system 64 and the timer 56 is identified as 68. The connection between the damping logic system 54 and the variable spring control means 42 is shown at 70.

Figure 6:
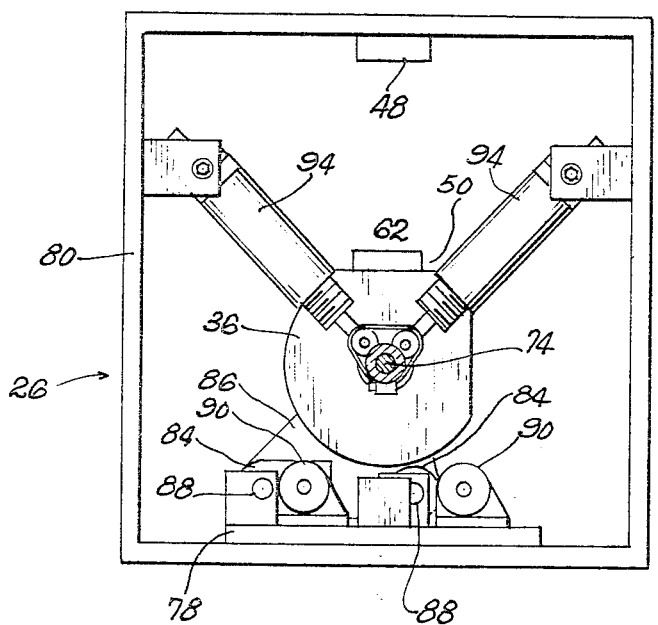
FIG. 6 is a transverse section of the damper mass unit, showing the unit equipped with variable damping devices.

FIGS. 4–6 illustrate the mechanical construction of a damping unit 72 which incorporates the damper mass 36 and the variable spring means 38. In FIG. 6, the damping unit is equipped with a plurality of the variable damping devices 62. The use of these devices is optional, as explained in connection with FIG. 3.

It will be seen from FIGS. 4–6 that the variable spring means 38 comprise a pair of spring bars or rods 74 which support the damper mass 36. As illustrated, the damper mass 36 is generally cylindrical in shape. The bars 74 extend axially in opposite directions from the damper mass 36. The outboard ends of the spring bars 74 are mounted in fixed supports 76 which are secured to a base or frame 78. The bars 74 act as opposite end portions of a beam, to support the damper mass 36. It will be recognized that the bars 74 act as resilient supports for the damper mass 36, so as to provide for the vibration of the damper mass. The base 78 is adapted to be mounted on the main vibratory body or mass, the vibrations of which are to be reduced. In FIG. 6, the main vibratory body 26 is shown, in the form of a rectangular column 80. The base 78 is secured to the inside of the column 80, so that the damper unit 72 is located within the hollow column.

The effective stiffness of the spring means is varied by changing the effective length of the spring bars 74. For this purpose, supporting sleeves 82 are slidable along the bars 74, between the fixed supports 76 and the damper mass 36. Each sleeve 82 is rigidly connected to a pair of sleeves 84 by means of an arm 86. The sleeves 84 are slidable along rigid guide rods or bars 88, solidly secured to the base 78. As the sleeves 82 are moved toward the damper mass 36 the effective lengths of the spring bars 74 are decreased, so that the effective stiffness of the bars is increased.

Various means could be provided to move the sleeves 82. For this purpose, the illustrated unit 72 is equipped with a pair of hydraulic cylinders 90 having piston rods 92. One of the piston rods 92 is connected to one of the sleeves or sliders 84 and the other piston rod is connected to the other sleeve or slider. Normally, the two hydraulic cylinders 90 are operated simultaneously so that both of the sleeves 82 will be moved along the spring bars 74 toward or away from the mass 36.

FIG. 6 illustrates the vibration pick-up 50, which is mounted on the damper mass 36. The other vibration pick-up 48 may be mounted on the column 80. For convenience, the vibration pick-ups 48 and 50 may be in the form of accelerometers, although the ultimate purpose of the pick-ups is to provide for the measurement of the phase angle between the vibratory displacement of the main mass 26 and the vibratory displacement of the damper mass 36. The use of accelerometers introduces no error, because the phase angle between the vibratory acceleration components is the same as the phase angle between the vibratory displacement components.

In FIG. 6, the variable damping means 62 are in the form of hydraulic cylinders 94 which are employed as variable hydraulic dash-pots. Low damping is provided by allowing free hydraulic circulation between the opposite ends of the cylinders 94. The damping is increased by restricting the circulation to some extent. Other types of variable damping devices might be employed, such as power operated variable friction devices, and electromagnetic devices affording variable drag.

Figure 7:
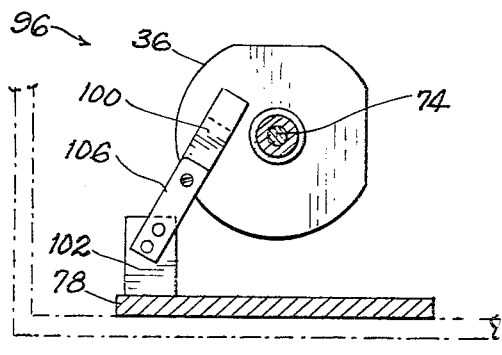
FIG. 7 is a fragmentary section, similar to FIG. 6, but showing the damper unit equipped with a manually adjustable damping device.
Figure 8:
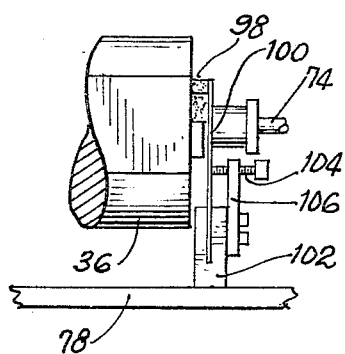
FIG. 8 is a fragmentary elevation, showing the adjustable damping device of FIG. 7.

FIGS. 7 and 8 illustrate manually adjustable damping devices 96 which may be employed instead of the variable hydraulic cylinders 94. Two of the friction devices 96 of FIGS. 7 and 8 are normally employed, one on each end of the damper mass 36. It will be seen that each friction device 96 comprises a friction shoe or block 98 which is pressed lightly against the end of the damper mass 36. The illustrated shoe 98 is mounted on the free end of a spring leaf or blade 100. The other end of the blade 100 is secured to a block 102 which is solidly mounted on the base 78. The pressure exerted by the spring 100 may be adjusted by turning a preload screw 104 which is engageable with an intermediate point on the blade 100. The preload screw 104 is supported by a bar or bracket 106, solidly mounted on the block 102. By advancing the screw 104, the shoe 98 may be pressed more firmly against the damper mass 36.

The adjustable friction devices of FIGS. 7 and 8 are adapted to be employed in the systems of FIGS. 1 and 2, in which the damping is not varied by the control system. In these systems, only the spring rate is varied. It will be realized that the spring rate is varied by operating the hydraulic cylinders 90 so as to move the sleeves 82 along the spring bars 74.

When the phase angle is greater than 90°, the sleeves 82 are moved closer to the damper mass 36, so as to increase the effective stiffness of the spring bars 74. When the phase angle is less than 90°, the sleeves 82 are moved from the damper mass 36 so as to decrease the effective stiffness of the spring bars 74.

Figure 9:
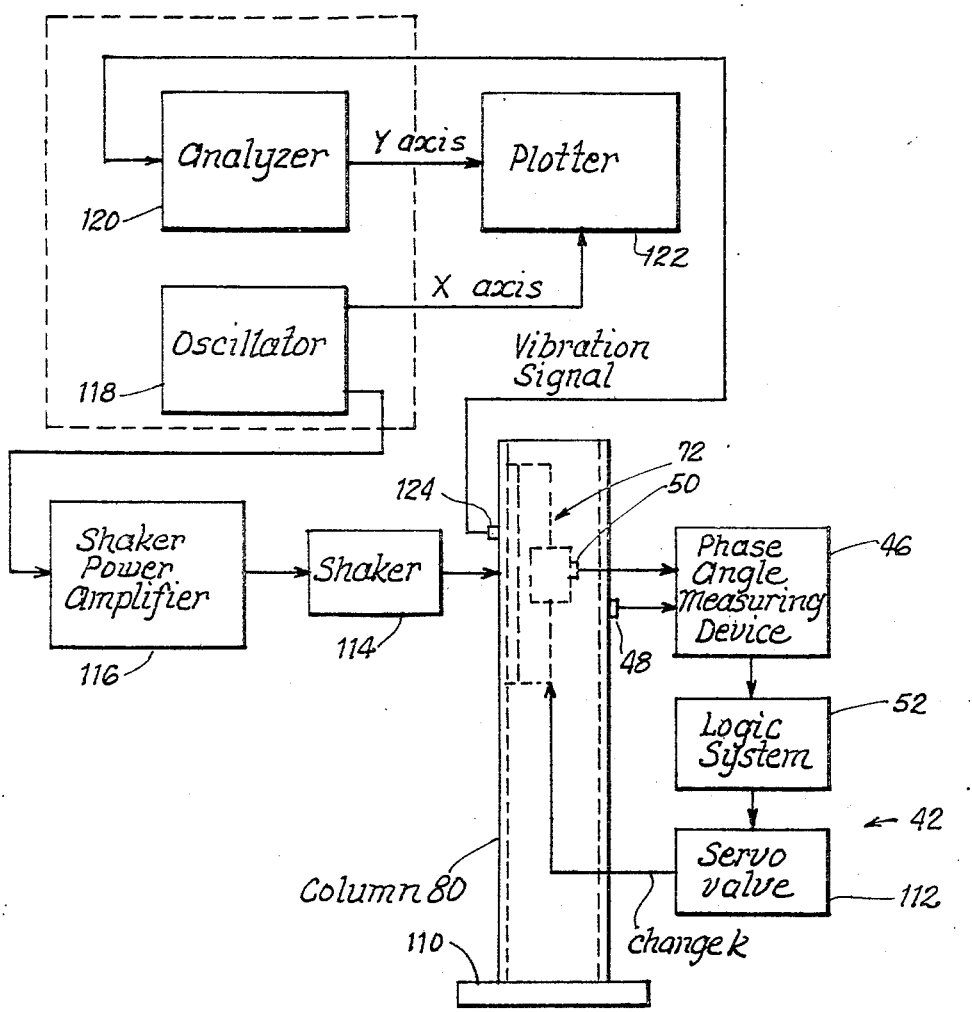
FIG. 9 is a schematic diagram, showing the damper unit in place on the vibratory body.

FIG. 9 is a diagrammatic illustration of the manner in which the damping unit 72 of FIGS. 4–6 may be mounted on the inside of the hollow column 80. It will be understood that the column 80 is merely an illustrative example of the main vibratory system 24 of FIGS. 1–3. The purpose of the damping unit 72 is to reduce the vibrations of the column 80. Such vibrations may be caused in actual service by machinery or the like. The use of the column 80 as the main vibratory system illustrates the point that the main vibratory mass 26 and the spring means 28 of FIG. 1 are usually distributed through the structure, the vibrations of which are to be reduced. The damping component 30 is also usually of a distributed character. The column 80 is mounted on a solid base 110 and is capable of vibrating, due to its mass component and its resilient supporting component. There is damping due to internal friction, air friction, and the transmission of a certain amount of vibratory energy into the base 110. The vibration of the column 80 causes flexure of the column relative to the base 110.

The damping unit 72 is mounted at a convenient point on the upper portion of the column 80. In this case, it is convenient to mount the damping unit 72 on the inside of the hollow column.

The control system associated with the damping unit 72 of FIG. 9 is essentially the same as described in connection with FIG. 1. The signals from the vibration pickups 48 and 50 are supplied to the phase angle measuring device 46, which in turn supplies a control signal to the logic system 52. The control device 42 comprises a servo valve 112 which operates the hydraulic cylinders 90 in response to the output of the logic system 52.

FIG. 9 shows a test set-up in which the column 80 is adapted to be vibrated by a magnetic shaker 114, driven by a power amplifier 116. The amplifier 116 receives its input from a variable frequency osciillator 118, so that the vibration frequency of the shaker 114 can be changed over a wide range. To measure the frequency response of the column 80, an analyzer 120 and a plotter 122 are supplied with a vibration signal from a pick-up 124 on the column 80. The plotter 122 also receives a signal from the oscillator 118.

Figure 15:
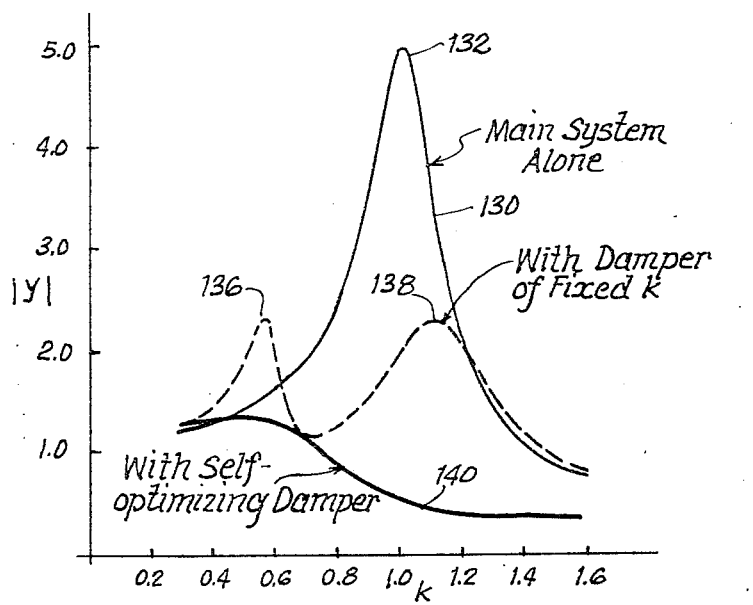
FIG. 15 is a graph illustrating the frequency response of the main system with the self-optimizing damper, as compared with the main system alone, and the main system with a damper having a fixed spring rate.

FIG. 15 illustrates the type of frequency response curves which are produced by the test set-up of FIG. 9. In FIG. 15, the vibration frequency is plotted along the horizontal axis, while the vibratory amplitude $y$ in the main system is plotted along the vertical axis. The scales should be regarded as relative rather than absolute.

It will be seen that FIG. 15 comprises a curve or graph 130 representing the frequency response of the main system alone. This curve has a high peak 132 representing a high vibratory amplitude at the natural frequency of the main system.

FIG. 15 also comprises a second curve 134 representing the frequency response of the system, when equipped with a vibration damper having a fixed spring rate. It will be seen that the single high peak 132 has been replaced with two lower peaks 136 and 138 at frequencies which are lower and higher than the frequency of the high peak. This double peaking effect is typical of vibration dampers having springs which are not variable.

FIG. 15 also comprises a third curve 140, representing the frequency response of the system with the self-optimizing vibration damper. It will be seen that the peaks have been eliminated. The vibratory amplitude is maintained at a low level throughout the frequency range. At the natural frequency of the main system, the self-optimizing damper greatly reduces the vibratory amplitude to a very low level.

Figure 10:
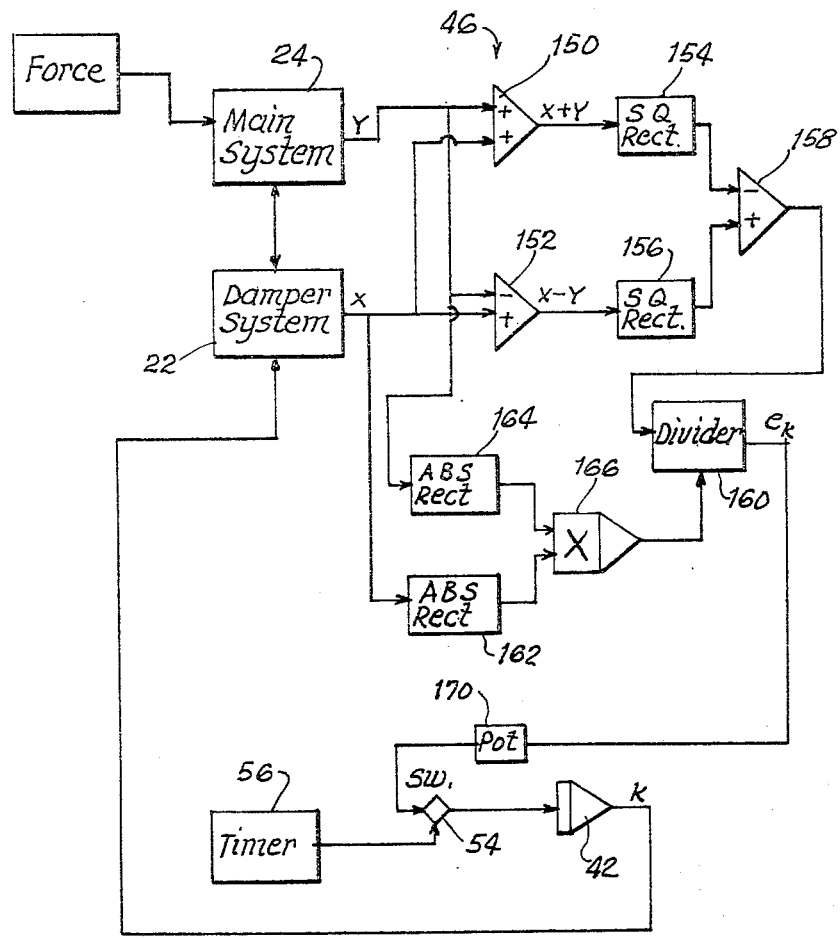
FIG. 10 is a schematic diagram of a self-optimizing damper system which is an elaboration of the system of FIG. 2.

FIG. 10 illustrates a system which is an elaboration of the system of FIG. 2. In particular, the phase angle measurement system 46 is illustrated in greater detail. In the system of FIG. 10, the phase angle error signal $e_k$ is derived by adding and subtracting the vibration signals $x$ and $y$ from the damper system 22 and the main system 24, squaring the sum and difference signals $x+y$ and $x-y$, subtractively combining the squared and rectified signals, and dividing the combined signal by the product of the absolute values of the $x$ and $y$ signals. This system produces an error signal which is proportional to the cosine of the phase angle between the $x$ and $y$ signals. Thus, the error signal changes polarity when the phase angle goes through 90°. The amplitude of the error signal increases rapidly as the phase angle departs from 90°.

This system of measuring the phase angle is known to those skilled in the art. Moreover, a number of other systems for measuring the phase angle are also known and may be employed instead of the system illustrated in FIG. 10.

It will be seen that the phase angle measurement system 46 of FIG. 10 comprises various analog computer components. Thus, the $x$ and $y$ signals are added by an adding amplifier 150, and are subtracted by a subtracting amplifier 152. The sum and difference signals are squared and rectified by squaring and rectifying circuit 154 and 156. The squared and rectified sum signal is subtracted from the squared and rectified difference signal by a subtracting amplifier 158. The output of the amplifier 158 is proportional to the cosine of the phase angle, but it is also proportional to the product of the absolute amplitude of the $x$ and $y$ signals. Thus, the output of the amplifier 158 is highly sensitive to variations of the amplitudes. To eliminate this amplitude sensitivity, the output of the amplifier 158 is passed through a dividing circuit 160, which divides the partially processed error signal by the product of the absolute values of the $x$ and $y$ signals. The absolute values are derived by employing absolute value and rectifier circuits 162 and 164, to which the $x$ and $y$ signals are supplied. The signals from the absolute value and rectifier circuits 162 and 164 are supplied to a multiplier 166, so as to derive the product. The product signal is supplied to the divider 160, which divides the product into the partially processed error signal from the subtracting amplifier 158. The result is the phase angle error signal $e_k$, which is a function of the cosine of the phase angle, and is substantially independent of the amplitudes of the $x$ and $y$ signals.

The level of the error signal is adjusted by a potentiometer 170, and the signal is then supplied to the logic switch 54, the same as in FIG. 2. The switch 54 is activated cyclically by the timer 56. The output of the switch 54 operates the control device 42, which may comprise a servo valve for supplying hydraulic fluid to the hydraulic cylinders 90 of FIGS. 4–6.

Figure 11:
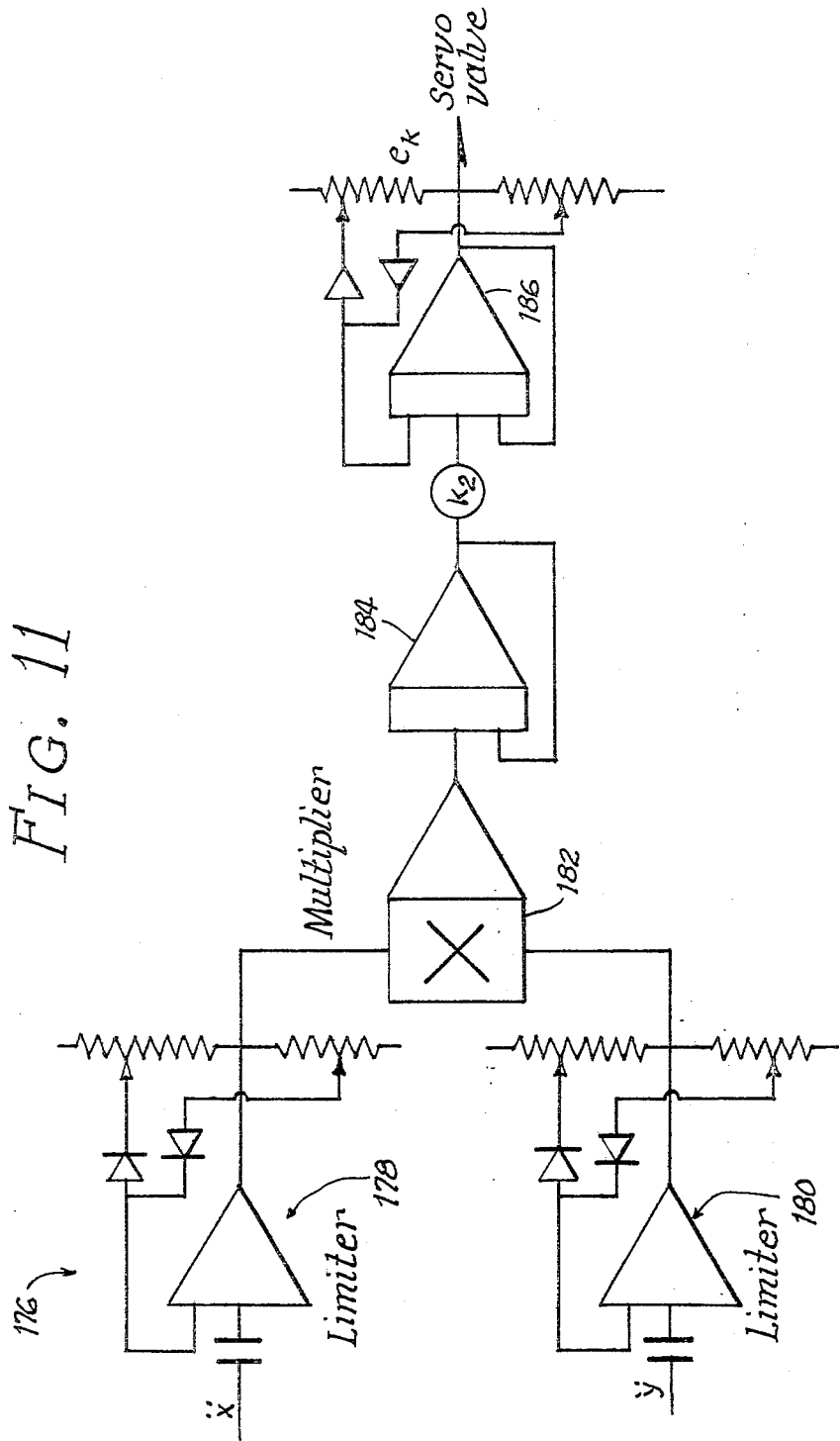
FIG. 11 is a schematic diagram of a modified circuit for measuring the phase angle and varying the adjustable spring means of the damper system.

FIG. 11 illustrates a modified measuring system 176 for deriving the phase angle error signal $e_k$. The system 176 may be employed instead of the system 46 of FIG. 10. The system 176 employs the method of amplifying and limiting the $x$ and $y$ signals to provide square wave signals of fixed amplitude. The limited signals are then multiplied and filtered. The result is an error signal $e_k$ which is a substantially linear function of the phase angle. The error signal changes polarity at 90°.

The multiplication of the $x$ and $y$ square waves produces a double frequency square wave which has a mean value or direct current component which varies as a function of the phase angle. The mean value is zero for a phase angle of 90°. As the phase angle decreases below 90°, the mean value is positive and increases as a linear function of the departure from 90°. For phase angles greater than 90°, the mean value is negative and increases as a linear function of the departure from 90°. The mean value is derived by integrating the multiplied square waves over the period and then dividing by this period.

Thus, the system 176 of FIG. 11 comprises limiting amplifiers 178 and 180 for amplifying the $x$ and $y$ signals. The output of each of these amplifiers is a square wave of fixed amplitude, corresponding in frequency and phase to the input signals. The square waves are fed to a multiplying amplifier 182, and the product is fed through dual filtering amplifiers 184 and 186 so as to derive the mean value. Amplifier 186, besides filtering, has a limiting circuit so that the servo valve will not be overloaded. The error signal $e_k$ may then be employed to operate the servo valve for the hydraulic cylinders, the same as for the system of FIG. 10.

Figure 13:
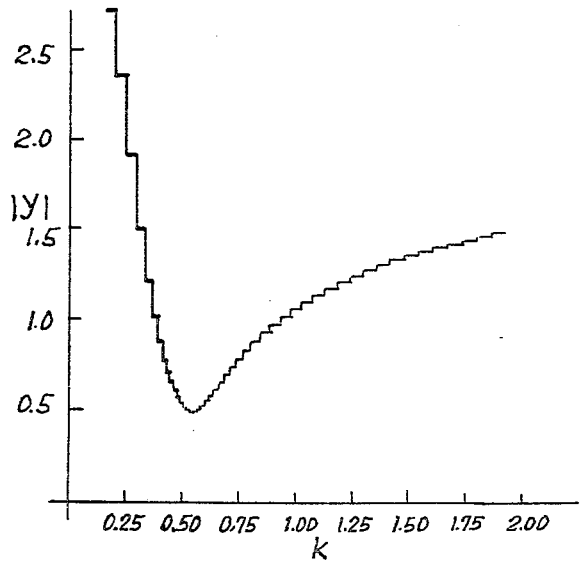
FIGS. 13 and 14 are graphs illustrating the manner in which the self-optimizing system of FIG. 1 varies the spring rate of the damper so as to minimize the vibrations of the main system.
Figure 14:
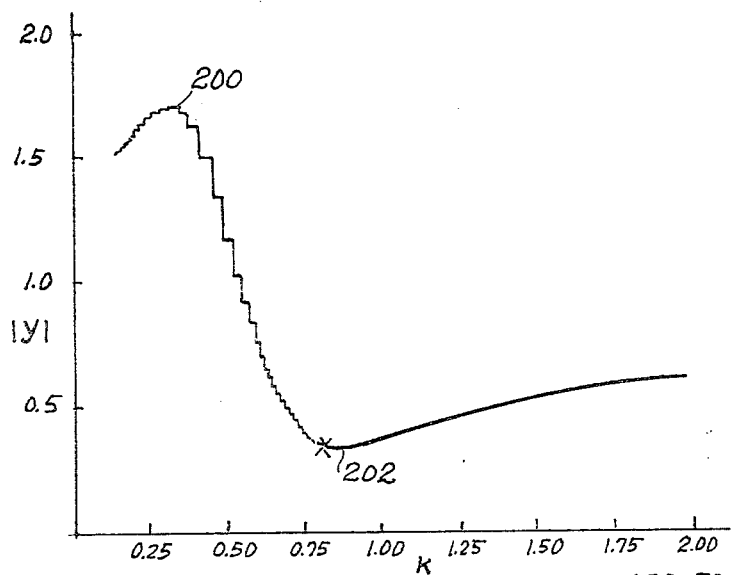

FIGS. 13 and 14 are graphs which illustrate the operation of a vibration reducing system of the type illustrated in FIG. 10. On each graph, the spring constant $k$ of the damper spring is plotted along the horizontal axis. The amplitude $y$ of the vibrations in the main system is plotted along the vertical axis. These graphs show the manner in which the amplitude y changes as the spring constant k is changed by the control system of the self-optimizing damper.

FIG. 13 represents the optimizing process for a somewhat lower vibration frequency than in the case of FIG. 14. It will be seen that the changes in the spring constant k are incremental, due to the action of the logic switch 54 and the timer 56. For each incremental change of the spring constant k, the amplitude value y undergoes a change. The succesive changes in the spring constant k bring about a great reduction in the amplitude y. It will be noted that the changes in the spring constant become smaller as the damper approaches the optimum condition. This is due to the reduction in the magnitude of the error signal as the optimum condition is approached.

The final value of the spring constant k as adjusted by the self optimizing damper is represented by the cross in FIG. 13. It will be seen that the final value departs very slightly from the condition of minimum amplitude. This is due to the use of the phase angle as the criterion for adjusting the spring constant. It will be recalled that the spring constant is adjusted to bring the phase angle to 90°. FIG. 13 illustrates that there is only a very small difference between this condition and the condition of minimum amplitude.

FIG. 14 is a graph similar to FIG. 13, but for a somewhat higher vibration frequency. Thus, the self-optimizing damper adjusts the spring constant k to a higher value. The final value of the spring constant is represented by a cross in FIG. 14. Here again, there is only a very slight difference between this value and the value which produces a minimum amplitude. The difference between the amplitude values is negligible. The scales in FIGS. 13 and 14 should be regarded as relative rather than absolute.

FIG. 14 illustrates an oddity in the variation of the amplitude as the spring constant k is adjusted from a low value to the final value, represented by the cross. It will be seen that at first the increase of the spring constant k causes an increase of the amplitude y to a maximum or peak 200. Further increases in the spring constant k cause the amplitude y to decrease to the final value represented by the cross. This is very near the actual minimum 202. The peak of the amplitude, as represented at 200, shows that the amplitude is an ambiguous criterion for the variation of the spring constant. To reach a true optimum condition from a low value of the spring constant, it is necessary to adjust the spring constant in a direction which actually increases the amplitude, until the peak 200 has been passed.

On the other hand, the phase angle is an unambiguous criterion. The departure of the phase angle from 90° decreases steadily as the spring constant is varied from the low value to the final value, represented by the cross, at which the departure of the phase angle from 90° is zero.

The variation of the spring constant k is incremental as illustrated in FIGS. 13 and 14. However, a nonincremental system may also be employed, in which the spring constant is changed steadily, until the phase angle is brought to 90°. This point will be described in greater detail in connection with FIG. 16.

FIG. 12 illustrates a double variable damper system 206 which is basically similar to the system of FIG. 3. In this case, filters 208 and 210 are employed between the accelerometers or pick-ups 48 and 50 and the phase angle measuring system 46. The filters 208 and 210 attenuate the higher harmonics and other high frequency components in the signals from the pick-ups 48 and 50.

As before, the phase angle measuring system 46 produces an error signal $e_k$ which changes polarity at 90°. The error signal is fed through the logic system 52 to the servo valve 112, which controls the supply of hydraulic fluid to the cylinders 90. The hydraulic fluid is supplied to one cylinder 90 if the error signal is positive and to the other cylinder if the error signal is negative. The cylinders 90 are tied together by an interconnecting line 212 running between corresponding ends of the two cylinders, so that the cylinders will act together, but in oposite directions. The other ends of the cylinders 90 are connected to the servo valve 112 by means of lines 214 and 216. When hydraulic pressure is applied to the line 214, the cylinders 90 move the sleeves 82 so as to decrease the effective length of the springs 74. When hydraulic pressure is applied to the line 216 the cylinders 90 move the sleeves 82 in the opposite direction so as to increase the effective length of the springs 74. Positive error signals are effective to operate the servo valve 112 in one direction while negative error signals are effective to operate the valve 112 in the opposite direction.

The incremental switching means 54, described generally in connection with FIGS. 2 and 3, comprise a pair of air operated valves 226 and 228 in FIG. 12. The valves 226 and 228 are connected into the hydraulic lines 214 and 216 between the servo valve 112 and the cylinders 90. Air is supplied cyclicly to the control line 230 running to the valves 226 and 228, so as to actuate the valves periodically. When the valves 226 and 228 are actuated, the servo valve 112 is able to supply hydraulic fluid to the cylinders 90, so that the spring rate will be changed incrementally.

In the system of FIG. 12, the timer 56 is pneumatically operated. Thus, the timer comprises an air cylinder 232 having a piston 234 which is caused to operate cyclicly back and forth. The piston 234 carries a piston rod 236 which is adapted to operate inner and outer limit valves 238 and 240. When the piston rod 236 is fully extended, it operates the outer limit valve 240 so as to supply air to the line 230, leading to the valves 226 and 228. The air is also supplied through a restrictive orifice 242 to one of the operating devices 244 of a reversing valve 246. It will be seen that the reversing valve 246 has output lines 248 and 250 connected to the opposite ends of the air cylinder 232. When air pressure is supplied to the operating device 244, the valve 246 is operated to the position shown in FIG. 12, in which the reversing valve 246 supplies air to the line 248, leading to the rod end of the cylinder 232. The piston 234 is thereby reversed, so that the rod 236 is retracted.

When the piston rod 236 approaches its inner limit of travel, it becomes disengaged from the inner limit valve 238, with the result that the valve 238 is shifted so that it supplies air to the other operating device 254 of the reversing valve 246. In this way, the valve 246 is reversed, so that air is supplied to the line 250 leading to the head end of the cylinder 232. Accordingly, the piston 234 is again reversed, so that the rod 236 begins its outward travel.

During the cycle of the reciprocating piston rod 236, the switch valves 226 and 228 are supplied with air for the brief intervals when the piston rod is engaging and operating the outer limit valve 240. Throughout the remainder of the cycle, the switch valves 228 are not supplied with operating air.

The system 206 of FIG. 12 also comprises means for changing the damping effect of the damping cylinders or dash-pots 94. These cylinders are normally filled with hydraulic fluid but air could also be employed. To provide relatively high damping, the corresponding ends of the cylinders 94 are connected together by means of a pair of restricted orifice devices 260 and 262. When relatively low damping is desired, orifices 264 and 266 are connected in parallel with the orifices 260 and 262, so that the fluid will flow with greater freedom between the ends of the cylinders. The orifices 264 and 266 are switched into the hydraulic circuit by air operated valves 268 and 270. It will be seen that the valves 268 and 270 have operating devices 271 and 273 which are connected to a line 272. A solenoid valve 274 is provided to supply air to the line 272. When the solenoid valve 274 is energized, the damping provided by the cylinders 94 is relatively low. When the valve 274 is de-energized, the damping is relatively high.

The solenoid valve 274 is operated by the damping logic system 64, as described in a general way in connection with FIG. 3. As illustrated in FIG. 12, the damping logic system 64 comprises high and low level comparators 280 and 282, to which the error signal $e_k$ is supplied. The comparator 280 compares the error signal with a large limit signal L, while the comparator 282 compares the error signal with a small limit signal S. The output signals from the comparators 280 and 282 are employed to control the state of a flip-flop electronic switch 284 which provides an on-off signal to switch the damping between its low and high values. The complemented output of the flip-flop 284 is connected to the solenoid 286 of the valve 274 through an amplifier 288. A gate 290 is connected between the comparator 282 and the flip-flop 284 to insure that the damping goes to its low value if the spring rate is below a low limit for the high value of damping.

In addition to switching the damping between its high and low values, the solenoid valve 274 controls the repetition rate of the timer 56. In the illustrated circuit this is done by changing the supply restriction in the line 294 which supplies air to the reversing valve 246. It will be seen that a restricted orifice device 296 is connected into the line 294, so as to reduce the repetition rate of the timer 56. The repetition rate is increased by switching an additional orifice device 298 in parallel with the orifice device 296. This switching operation is carried out by an air operated valve 300, controlled by a relay valve 301, having its operating device 302 connected to the valve 274. When the valve 274 is actuated to provide low damping, the valve 300 is deactuated to reduce the speed of the timer 56.

In summary, the system of FIG. 12 provides control over both the spring rate and the damping. When the phase angle between the damper vibration signal $x$ and the main vibration signal $y$ is less than 90°, the servo valve 112 is operated in such a direction that the hydraulic cylinders 90 decrease the spring rate, by increasing the effective length of the springs 74. When the phase angle is greater than 90°, the error signal $e_k$ produced by the phase angle measuring system 46 changes polarity, so that the valve 112 is reversed. The hydraulic cylinders 90 then increase the spring rate by decreasing the effective length of the spring 74.

When the magnitude of the error signal $e_k$ is large, the solenoid valve 274 is not operated, with the result that the damping produced by the cylinders 94 is relatively high. When the error signal is reduced to a sufficiently low value, the solenoid valve 274 is operated, with the result that the additional orifice devices 264 and 266 are switched into the hydraulic circuit by the valves 268 and 270. In this way, the damping is reduced to its low value. At the same time, the speed of the timer 256 is decreased by the operation of the valve 301.

Figure 16:
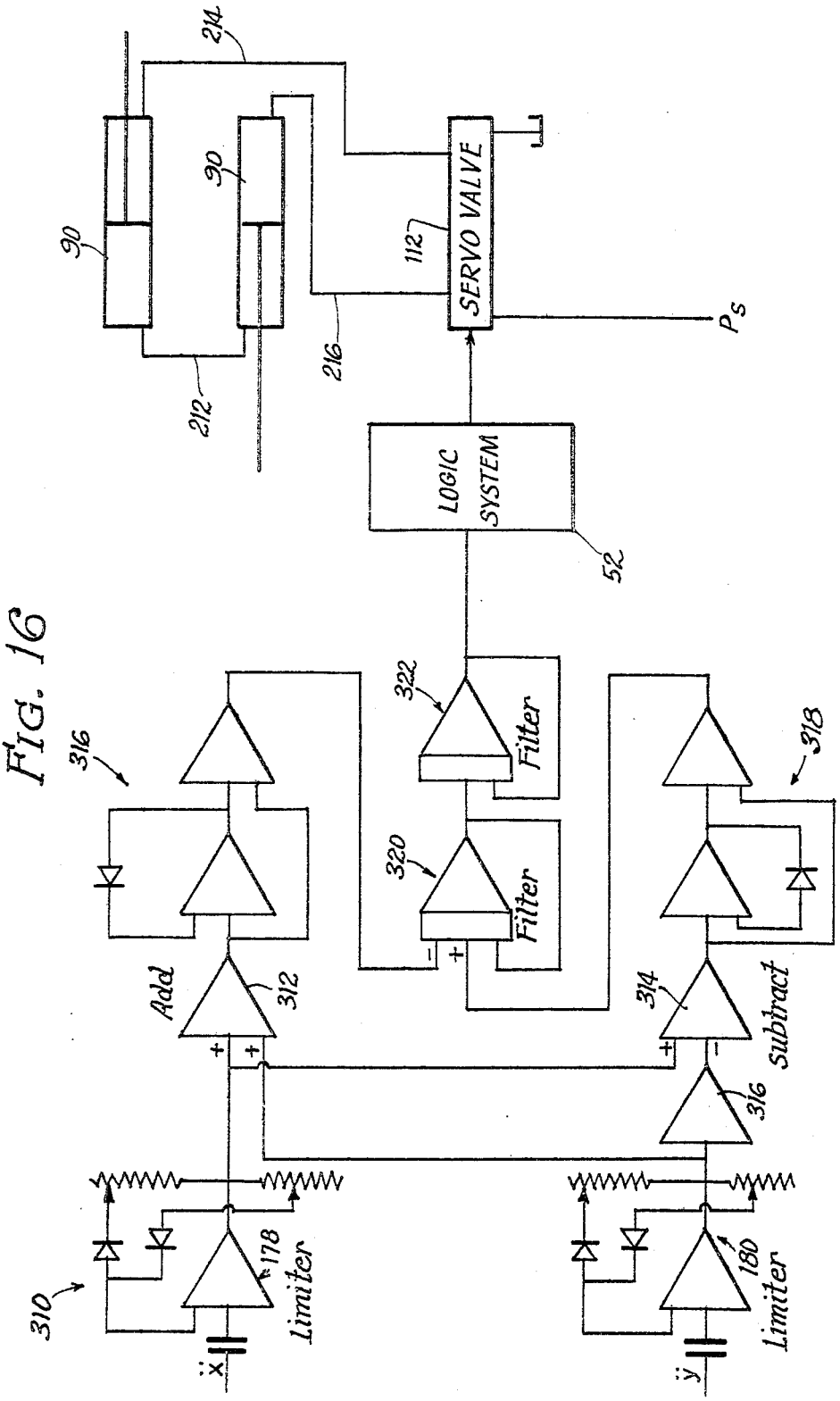
FIG. 16 is a schematic diagram of a modified system for measuring the phase angle and varying the spring rate.

FIG. 16 illustrates a modified control system 310 which is similar in some respects to the system 176 of FIG. 11. Thus, the system 310 employs the high gain limiting amplifiers 178 and 180 of FIG. 11 to convert the damper vibration signal $x$ and the main vibration signal $y$ into square waves of fixed amplitude. However, instead of deriving the product of the square waves, as in FIG. 11, the system 310 of FIG. 16 comprises means for deriving the sum and difference of the square waves. The absolute value of the sum is then subtracted from the absolute value of the difference, to produce a combined signal having a mean value which is a linear function of the phase angle between the $x$ and $y$ signals. The mean value changes polarity at 90°.

Thus, the system 310 of FIG. 16 comprises an adding amplifier 312 which adds the square waves from the limiters 178 and 180. The outputs of the limiters 178 and 180 are fed directly to the adding amplifier 312.

The $x$ and $y$ square waves are combined subtractively by a second amplifier 314. A phase inverting amplifier 316 is connected between the output of the limiter 180 and amplifier 314 to produce the subtraction.

The sum and difference signals from the amplifiers 312 and 314 are fed through absolute value amplifiers 316 and 318. The resulting absolute value signals are combined subtractively at the input of a filtering amplifier 320. Thus, the absolute value of the sum is subtracted from the absolute value of the difference. A second filtering amplifier 322 is connected to the output of the filtering amplifier 320. The amplifiers 320 and 322 derive the mean value of the combined absolute value signal. Thus the error signal $e_k$ appears at the output of the filtering amplifier 322.

The phase angle measuring system of FIG. 16 derives an error signal which is similar to the signal derived by the system of FIG. 11, in that the error signal is a linear function of the phase angle. Moreover, the error signal changes polarity at 90°. However, the system of FIG. 16 is preferred, because it does not require any multiplier. The components of the system of FIG. 16 are all inexpensive. On the other hand, the multiplier employed in FIG. 11 is relatively expensive. Thus, the cost of the system of FIG. 16 is considerably less than that of the system of FIG. 11. Moreover, the system of FIG. 16 is more reliable.

In connection with FIG. 11, it has been indicated that the spring rate of the damper may be varied either incrementally or steadily. In the systems of FIGS. 10 and 12, the spring rate is varied incrementally. In the system 310 of FIG. 16, on the other hand, the spring rate is varied steadily or continuously, in response to the error signal $e_k$. Thus, the error signal from the output of the filtering amplifier 322 is fed through the logic system 52 to the servo valve 112, which controls the hydraulic cylinders 90, without the use of any timer or switching device. The arrangement of the logic system 52 and the servo valve 112 is otherwise similar to that described in connection with FIG. 12. The servo valve 112 supplies hydraulic fluid to one of the cylinders 90 when the error signal $e_k$ is positive, and to the other cylinder 90 when the error signal is negative. Thus, the spring rate is increased when the phase angle is greater than 90°, and is decreased when the phase angle is less than 90°.

In the diagrammatic illustration of FIG. 1, the main system 24 has been represented as comprising a single mass 26 and a single spring 28. This has been done for the sake of simplicity of illustration. However, most vibratory systems are capable of a plurality of modes of vibration, and thus must be represented by a plurality of masses and a plurality of springs. The present invention is applicable to such complex vibratory systems and is capable of reducing the vibrations in a plurality of different modes.

While the vibratory column 80 of FIG. 9 has been considered thus far as a simple vibratory system, it is actually a complex system capable of a plurality of different modes of vibration. The self-optimizing damper system 72, with its control system, is capable of minimizing the vibrations in a plurality of different modes.

Figure 17:
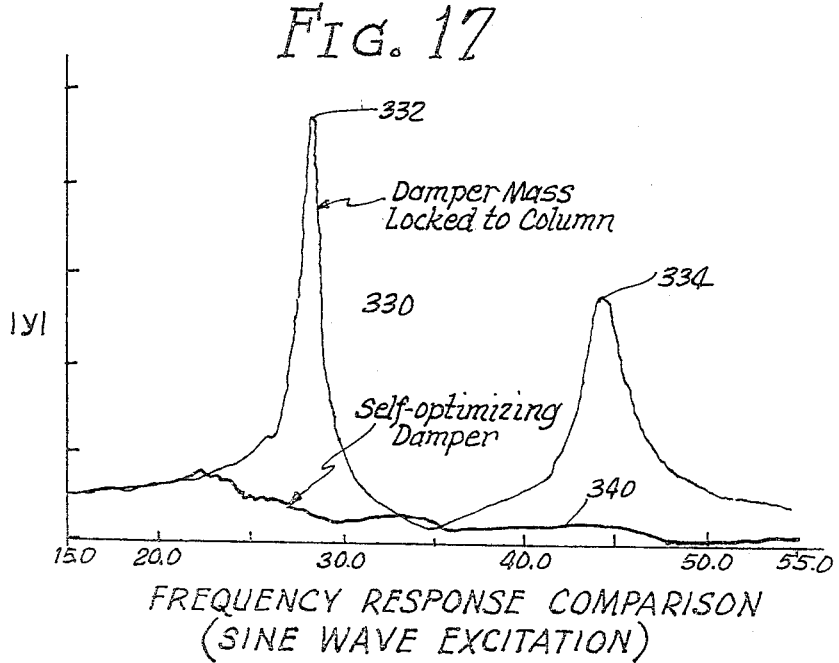
FIGS. 17 and 18 are graphs illustrating the frequency response of the system of FIG. 9, with and without the self-optimizing damper in operation.

This feature of the self-optimizing damper is illustrated in FIG. 17, which is a graph showing the frequency response of the column 80, with and without the vibration reducing effect of the damper. Thus, FIG. 17 comprises a first curve 330 representing the frequency response of the vibratory column, when the damper is rendered inoperative locking the damper mass to the column. It will be seen that the curve 330 shows two peaks 332 and 334, representing the natural vibratory frequencies of the column in two different modes of vibration. The first peak 332 is at a frequency of approximately 28 cycles per second, while the second peak 334 is at frequency of approximately 44 cycles per second. In FIG. 17, the frequency of the exciting vibration is plotted along the horizontal axis while the amplitude of the vibration in the main system is plotted along the vertical axis. The curves were produced by gradually varying the exciting frequency and noting the amplitudes of the vibrations in the main system.

FIG. 17 comprises a second curve 340, representing the frequency response when the self-optimizing damper is in full operation. It will be noted that the self-optimizing damper reduces both of the peaks 332 and 334, representing the natural frequencies of the system in two different modes of vibration. The self-optimizing damper maintains the vibrations of the main system at an extremely low level throughout the frequency range.

The self-optimizing damper, particularly with the general configuration of FIGS. 4-8, will reduce vibrations in two coordinate directions or any resultant thereof, lying in a plane perpendicular to the axis of the spring supports, rather than in one direction, as in the case of certain prior devices.

Figure 18:
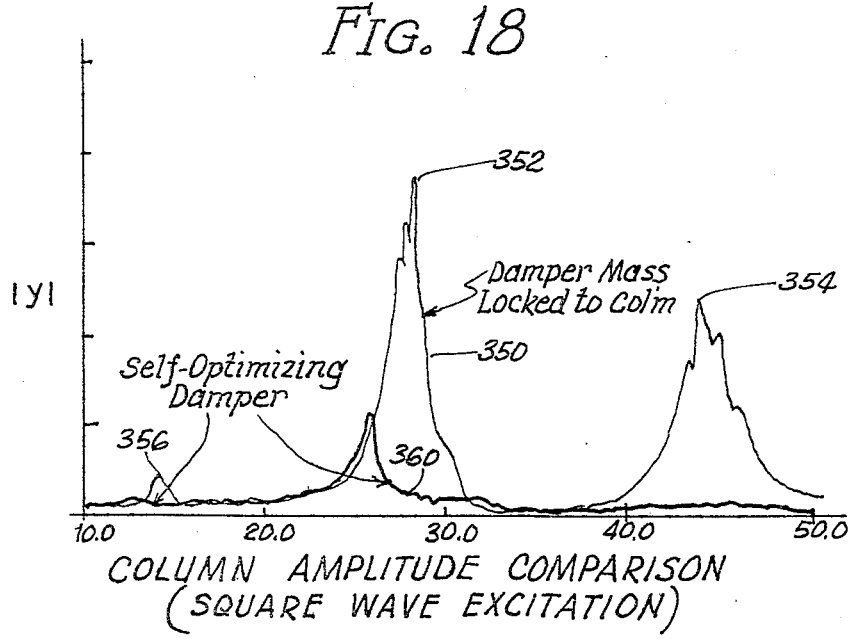

The curves of FIG. 17 represent sine wave excitation of the main system. Thus, the shaker, which provides the excitation, is supplied with sine waves, FIG. 18 is similar to FIG. 17, but shows the ability of the self-optimizing damper to reduce vibrations when the excitation is in the form of square waves. With the damper locked out of operation, the main system shows a curve 350 with three peaks 352, 354, and 356. As before, the peaks 352 and 354 are at approximately 28 cycles and 44 cycles per second. The third peak 356 is at approximately 14 cycles per second, representing excitation of the column by the third harmonic of the square waves. With the self-optimizing damper in full operation, the system shows a curve 360, in which the peaks 354 and 356 are removed entirely. The peak 352 is reduced to a low level. This curve shows the ability of the self-optimizing damper to suppress vibrations due to harmonic excitation of the vibratory system by an exciting force having complex wave form.

It will be recognized that the self-optimizing vibration damper of the present invention is highly advantageous, because it is capable of adapting itself to wide variations in the frequency of the vibration in the main system. The control system of the self-optimizing damper varies the spring rate of the damper spring, so that the phase angle between the main system vibration and the damper system vibration is brought to 90°. The phase angle provides an unambiguous criterion so that the spring rate is always varied in the correct direction to minimize the vibration in the main system. The self-optimizing vibration damper is capable of reducing the vibration in the main system to a low level through a wide frequency range.

The self-optimizing damper may optionally include means for changing the damping, as well as the spring rate, in the damper system. However, the self-optimizing damper provides very good performance when only the spring rate is varied by the control system.

We claim:
1. A self-optimizing vibration minimizing device for reducing the vibrations of a main vibratory member, said device comprising the combination of supporting means adapted to be secured to said vibratory member,
an auxiliary vibratory system including an auxiliary vibratory mass and spring means connected between said mass and said supporting member to support said mass for vibration,
said auxiliary vibratory system including variable tuning means for changing the tuning of said auxiliary vibratory system,
and control means responsive to the phase angle between the vibrations of said main vibratory member and said auxiliary vibratory mass for actuating said variable tuning means to bring said phase angle to approximately 90°.

2. A device according to claim 1,
in which said variable tuning means comprise means for varying the effective spring rate of said spring means.
3. A device according to claim 1,
in which said variable tuning means comprise means for changing the effective length of said spring means.
4. A device according to claim 1,
in which said spring means comprise a flexible elongated spring member,
said mass being mounted on said spring member at an intermediate point between the ends thereof,
said variable tuning means comprising a pair of movable members supporting the opposite ends of said spring member,
and power means for moving said movable members to change the effective length of said spring member.
5. A device according to claim 1,
including variable damping means for damping the vibrations of said mass,
and means for reducing the damping produced by said variable damping means in response to reduction of vibrations of said vibratory member.
6. A device according to claim 1,
including a damping device for frictionally damping the vibrations of said mass.
7. A device according to claim 1,
including damping means for frictionally damping the vibrations of said mass,
and means for adjusting the frictional damping afforded by said damping means.
8. A device according to claim 1,
in which said control means comprise first and second vibration pick-ups for producing first and second signals corresponding to the vibrations of said vibratory member and said auxiliary vibratory mass,
and measuring means for measuring the phase angle between said signals.
9. A device according to claim 1,
including vibration pick-up means for sensing the vibrations of said vibratory member and said auxiliary vibratory mass while measuring the phase angle between said vibrations.
10. A system for reducing vibrations,
comprising a main vibratory body, the vibrations of which are to be reduced,
an auxiliary vibratory system including an auxiliary mass and spring means connected between said mass and said vibratory body,
variable tuning means for changing the tuning of said auxiliary vibratory system,
measuring means for measuring the phase angle between the vibrations of said body and said mass,
and control means connected to said measuring means for actuating said variable tuning means to cause said phase angle to approach 90°.
11. A system according to claim 10,
in which said variable tuning means comprise means for varying the effective spring rate of said spring means.
12. A system according to claim 10,
in which said control means comprise means for causing said variable tuning means to change the tuning of said auxiliary vibratory system to a higher natural frequency when said phase angle is greater than 90°, while causing said tuning means to decrease the natural frequency when said phase angle is less than 90°.
13. A system according to claim 10,
including a variable damping device for damping the vibrations of said auxiliary mass,
and means for causing said variable damping device to reduce the damping of said auxiliary mass as said phase angle approaches 90°.

14. A system according to claim 10,
including a variable damping device for damping the vibrations of said auxiliary mass,
and means for causing said damping device to reduce the damping of said mass in response to reduction in the vibrations of the main vibratory body.

15. A system according to claim 10,
including means for frictionally damping the vibrations of said auxiliary mass.

16. A system according to claim 10,
including adjustable means for frictionally damping the vibrations of the auxiliary mass.

17. A system according to claim 10,
in which said measuring means comprise first and second vibration pick-ups for producing first and second signals corresponding to the vibrations of said body and said auxiliary mass,
and means for measuring the phase angle between said signals,
said control means including means for varying said tuning means in response to the phase angle between said signals.

18. A system according to claim 10,
in which said measuring means include first and second vibration pick-ups for producing first and second signals corresponding to the vibrations of said body and said auxiliary mass,
and means for receiving said signals and producing a control signal which changes polarity when the phase angle between said first and second signals goes through 90°,
said control means including means for utilizing said control signal to vary said tuning means so as to increase the natural frequency of said auxiliary vibratory system when the phase angle is greater than 90°, while decreasing the natural frequency when the phase angle is less than 90°.

19. A system according to claim 10,
including a variable damping device for damping the vibrations of said auxiliary mass,
and means for causing said variable damping device to reduce the damping of said mass when the phase angle approaches 90° and when there is also a reduction in the vibrations of the vibratory body.

20. A device according to claim 1,
including a variable damping device for damping the vibrations of said auxiliary mass,
and means for reducing the damping produced by said variable damping device as the phase angle approaches 90°.

21. A device according to claim 1,
including a variable damping device for damping the vibrations of said auxiliary mass,
and means for causing said variable damping device to reduce the damping on said mass as the phase angle approaches 90° provided there is also a reduction in the vibration of said vibratory member.

22. A system according to claim 10,
in which said control means comprise timer means for varying said control means incrementally.

23. A system according to claim 10,
in which said control means is constructed and arranged to vary said tuning means steadily.

24. A system according to claim 10,
in which said control means comprise a timer for varying said tuning means incrementally,
said system comprising a variable damping device for damping the vibrations of said auxiliary mass,
means for causing said variable damping device to reduce the damping of said mass as the phase angle approaches 90°,
and means for varying the repetition rate of said timer means as the phase angle approaches 90°.

25. A system according to claim 18,
including a variable damping device for damping the vibrations of said auxiliary mass,
and means for causing said variable damping device to reduce the damping of said mass in response to reduction in the magnitude of said control signal.

26. A system according to claim 18,
in which said control means comprise timer means for varying said tuning means incrementally,
said system comprising a variable damping device for damping the vibrations of said auxiliary mass,
means for causing said variable damping device to reduce the damping of said mass in response to reduction in the magnitude of said control signal,
and means for reducing the repetition rate of said timer means in response to reduction in the magnitude of said control signal.

27. A system according to claim 14,
in which said variable damping device comprises a variable dash-pot.

28. A system according to claim 18,
in which said measuring means comprise means for deriving square waves of fixed magnitude corresponding to said first and second signals,
adder means for deriving the sum of said square waves,
subtracter means for deriving the difference of said square waves,
first and second absolute value means for deriving the absolute values of said sum and difference,
additional subtracter means for deriving a difference signal corresponding to the difference between the absolute value of said difference and the absolute value of said sum,
and means for deriving said control signal as the mean value of said difference signal.

29. A self-optimizing vibration minimizing device for reducing the disturbing vibrations of a main vibratory member,
said device comprising the combination of supporting means adapted to be secured to said vibratory member,
an auxiliary vibratory system including an auxiliary vibratory mass and spring means connected between said mass and said supporting member,
tuning means for changing the tuning of said auxiliary vibratory system,
control means for actuating said tuning means to bring the natural frequency of said auxiliary vibratory system to an optimum condition corresponding approximately to the frequency of the disturbing vibrations,
a variable damping device for damping the vibrations of said auxiliary vibratory mass,
and means for causing said damping device to reduce the damping of said mass as said auxiliary vibratory system is brought to said optimum condition.

30. A self-optimizing vibration damper for reducing the vibrations of a vibratory member,
comprising the combination of supporting means adapted to be secured to said vibratory member,
a vibratory damper mass,
spring means connected between said damper mass and said supporting means,
said spring means supporting said damper mass for vibration,
control means for varying the stiffness of said spring means,
a first vibration pick-up for producing a first signal corresponding to the vibrations of said vibratory member,
a second vibration pick-up for producing a second signal corresponding to the vibrations of said damper mass,
measuring means for receiving said signals and measuring the phase angle between said signals,
and means connected between said measuring means and said control means for causing said control means to increase the stiffness when the phase angle exceeds 90° while decreasing the stiffness when the phase angle is less than 90°.

References Cited

UNITED STATES PATENTS 2,361,071  10/1944  Vang.
2,838,137  6/1958  Wallerstein.
3,358,231  12/1967  Baganoff.

DUANE A. REGER, Primary Examiner

U.S. Cl. X.R.

324—83